(12) United States Patent
Huang et al.

(10) Patent No.: US 10,001,824 B2
(45) Date of Patent: *Jun. 19, 2018

(54) POWER SYSTEM AND POWER ALLOCATION METHOD THEREOF

(71) Applicant: DELTA ELECTRONICS, INC., Taoyuan (TW)

(72) Inventors: Hui Huang, Taoyuan (TW); Guo-Dong Yin, Taoyuan (TW); Tie Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 95 days.

This patent is subject to a terminal disclaimer.

(21) Appl. No.: 15/168,258

(22) Filed: May 31, 2016

(65) Prior Publication Data

US 2017/0038809 A1 Feb. 9, 2017

(30) Foreign Application Priority Data

Aug. 4, 2015 (CN) .......................... 2015 1 0471413

(51) Int. Cl.
*G06F 9/00* (2006.01)
*G06F 1/26* (2006.01)
*G06F 1/32* (2006.01)
*H02J 1/10* (2006.01)

(52) U.S. Cl.
CPC ............. *G06F 1/266* (2013.01); *G06F 1/263* (2013.01); *G06F 1/3296* (2013.01); *H02J 1/10* (2013.01); *Y02D 10/172* (2018.01)

(58) Field of Classification Search
CPC ...................................................... G06F 1/3234
USPC ........... 713/323, 320; 710/266, 18, 108, 262
See application file for complete search history.

(56) References Cited

U.S. PATENT DOCUMENTS

| | | | | |
|---|---|---|---|---|
| 6,282,665 B1* | 8/2001 | Cruz | ..................... | G06F 1/3203 713/320 |
| 6,633,940 B1* | 10/2003 | Alasti | ..................... | G06F 13/24 710/262 |
| 8,067,857 B2* | 11/2011 | Humphrey | .............. | G06F 1/263 307/82 |
| 2008/0066035 A1* | 3/2008 | Asao | ................... | G06F 17/5036 716/108 |

(Continued)

FOREIGN PATENT DOCUMENTS

| | | |
|---|---|---|
| CN | 201130312 Y | 10/2008 |
| CN | 101441446 B | 5/2012 |

(Continued)

*Primary Examiner* — Aurel Prifti
(74) *Attorney, Agent, or Firm* — CKC & Partners Co., Ltd.

(57) ABSTRACT

A power system including power devices connected in parallel and an allocation bus is provided. Each power devices includes an allocation signal pin, a power unit and a control unit. The control unit controls a logic level of the allocation signal pin based on an operation status of the power unit. The AND logic operation performed on the logic level of the allocation signal pin of each of the power devices results in the logic level of the allocation bus. One of the power devices is set to a master mode through a first arbitration. The other power devices monitor the operation status of each other and a status of the allocation bus. Through a second arbitration, one of the power devices under a first operation status is set to a standby mode.

20 Claims, 7 Drawing Sheets

(56) References Cited

U.S. PATENT DOCUMENTS

| | | | | |
|---|---|---|---|---|
| 2010/0088446 | A1* | 4/2010 | Greb | G06F 13/24 |
| | | | | 710/266 |
| 2011/0113164 | A1* | 5/2011 | Venkatsuresh | G06F 13/24 |
| | | | | 710/18 |
| 2011/0191612 | A1* | 8/2011 | Itakura | H02J 3/005 |
| | | | | 713/320 |
| 2016/0018873 | A1* | 1/2016 | Fernald | H04W 52/0229 |
| | | | | 713/323 |
| 2016/0372174 | A1* | 12/2016 | Ohsawa | G11C 11/1673 |

FOREIGN PATENT DOCUMENTS

| | | |
|---|---|---|
| CN | 101834319 B | 2/2013 |
| CN | 102104277 B | 9/2013 |
| CN | 102224654 B | 10/2014 |
| TW | I296168 B | 4/2008 |
| TW | 201334368 A | 8/2013 |
| TW | 201429101 A | 7/2014 |
| TW | I466410 B | 12/2014 |
| TW | I481156 B | 4/2015 |

* cited by examiner

POWER SYSTEM AND POWER ALLOCATION METHOD THEREOF

RELATED APPLICATIONS

This application claims priority to China Application Serial Number 201510471413.2, filed Aug. 4, 2015, which is herein incorporated by reference.

BACKGROUND

Field of Invention

The present invention relates to a power technology. More particularly, the present invention relates to a power system and a power allocation method thereof.

Description of Related Art

Science and technology are highly developed nowadays. More and more power companies pay great emphasis on the directions of high efficiency, high power density, high reliability and low cost to develop more competitive products. In order to achieve high reliability, it is common to connect a multiple of power devices in parallel to form a redundant power system. In the redundant power system, the maximum power consumed by the system normally falls on the optimal efficiency point of the redundant power system. However, in actual applications, the system load varies according to the operating circumstance. For a system in a mobile communication base station, the power consumption is much less during the nighttime than that during the daytime. Consequently, the power system operates in a light load status with low efficiency for a pretty long time. Besides, the control technology of the power device and the technology for efficiency optimization of the semiconductor devices are already too mature to make any obvious enhancement. And it takes much more complicated control strategy and parameter adjustment for the power device to achieve even one percent of increase on the efficiency.

Accordingly, what is needed is a power system and a power allocation method thereof to address the above issues.

SUMMARY

An aspect of the present invention is to provide a power system that includes a plurality of power devices and an allocation bus. The power devices are connected in parallel and each of the power devices includes an allocation signal pin, a power output unit and a control unit. The control unit is electrically coupled to the power output unit and the allocation signal pin, wherein the control unit controls a logic level of the allocation signal pin based on an operation status of the power output unit. The allocation bus is electrically coupled to the allocation signal pin of each one of the power devices to become a synchronized signal bus, wherein an AND logic operation performed on the logic level of the allocation signal pin of each of the power devices results in the logic level of the allocation bus. One of the power devices is under a master mode and the other power devices under an operation mode simultaneously monitor the operation status of each other and the logic level of the allocation bus such that when at least one of the power devices under the operation mode is under a first operation status and the allocation bus is at a first logic level, the power system sets one of the power devices under the first operation status to a standby mode through a second arbitration and controls the allocation signal pin to output the first logic level.

Yet another aspect of the present invention is to provide a power allocation method used in a power system. The power system includes a plurality power devices connected in parallel and an allocation bus, wherein each of the power devices includes an allocation signal pin, a power output unit and a control unit electrically coupled to the power output unit and the allocation signal pin, wherein the control unit controls a logic level of the allocation signal pin based on an operation status of the power output unit and the allocation bus is electrically coupled to the allocation signal pin of each one of the power devices to become a synchronized signal bus, wherein an AND logic operation performed on the logic level of the allocation signal pin of each of the power devices results in the logic level of the allocation bus. The power allocation method includes the steps outlined below. One of the power devices is set under a master mode. When at least one of the power devices under an operation mode is under a first operation status and the allocation bus is at a first logic level, setting one of the power devices under the first operation status to a standby mode through a second arbitration and controlling the allocation signal pin to output the first logic level.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
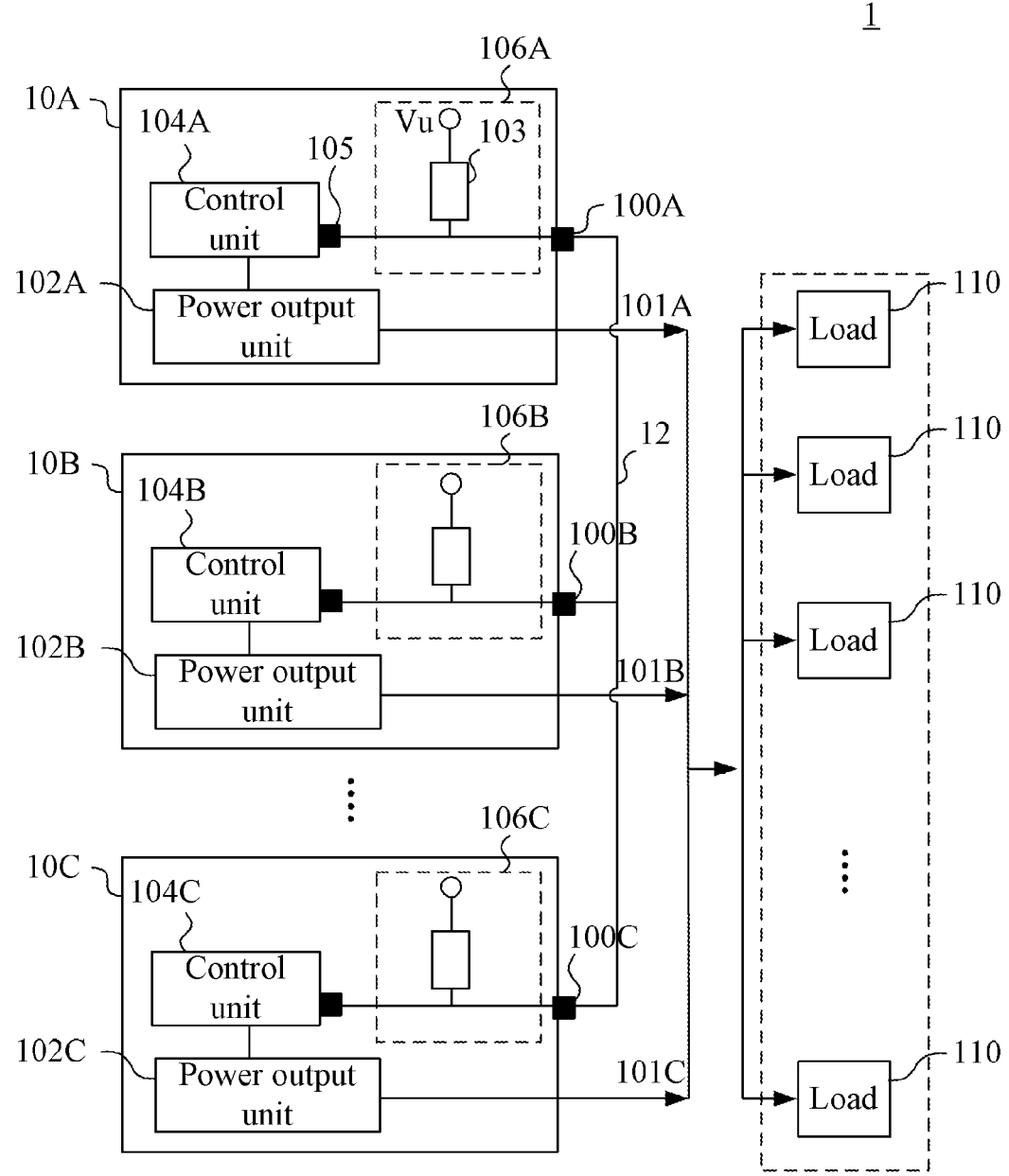
FIG. 1 is a block diagram of a power system in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference is now made to FIG. 1. FIG. 1 is a block diagram of a power system 1 in an embodiment of the present invention. The power system 1 includes a plurality of power devices 10A-10C connected in parallel and an allocation bus 12. In an embodiment, the power devices 10A-10C of the power system 1 form a redundant power system.

Each of the power devices 10A-10C includes an allocation signal pin 100A-100C, a power output unit 102A-102C and a control unit 104A-104C. Taking the power device 10A as an example, the control unit 104A thereof is electrically coupled to the power output unit 102A and the allocation signal pin 100A.

The power devices 10A-10C outputs currents 101A-101C by using the power output units 102A-102C under the operation mode to supply power to a load 110. In different embodiments, the number of the power devices 10A-10C and the load 110 can be adjusted according to practical needs and is not limited by the number illustrated in FIG. 1.

The control units 104A-104C control a logic level of the corresponding allocation signal pins 100A-100C based on an operation status of the power output units 102A-102C. In an embodiment, the control units 104A-104C control the logic level of the corresponding allocation signal pins 100A-100C through pull-up circuits 106A-106C in the power devices 10A-10C respectively.

In an embodiment, taking the pull-up circuit 106A as an example, the pull-up circuit 106A includes a pull-up resistor 103 and a pull-up voltage Vu. The first end of the pull-up circuit 106A is electrically coupled to the control unit 104A and the second end of the pull-up circuit 106A is electrically coupled to the allocation signal pin 100A. The first end of the pull-up resistor 103 is electrically coupled to the pull-up voltage Vu and the second end of the pull-up resistor 103 is electrically coupled to the first end and the second end of the pull-up circuit 106A. When the control unit 104A sets a pin 105 thereof to be the low level, the first end of the pull-up circuit 106A and the second end of the pull-up resistor 103 are at the low level such that the second end of the pull-up circuit 106A becomes low level to set the allocation signal pin 100A to be the low level. On the contrary, when the control unit 104A sets the pin 105 to be the high impedance state, since the second end of the pull-up resistor 103 is electrically coupled to the second end of the pull-up circuit 106A, the pull-up voltage Vu forces the second end of the pull-up circuit 106A to output the high level through the pull-up resistor 103 to further set the allocation signal pin 100A to be the high level.

In an embodiment, in the redundant power system 1, the power devices 10A-10C have a current averaging characteristic. In other words, the current values of the currents 101A-101C generated by the power devices 10A-10C are identical to share the loading.

As a result, for a single power device, such as the power device 10A, the load condition of the whole power system 1 can be determined according to the load condition of the power output unit 102A thereof. In an embodiment, the control unit 104A obtains the load condition of the power system 1 and the operation status of the corresponding power output unit 102A based on the sampled current value of the currents 101A-101C to control the logic level of the allocation signal pin 100A.

The allocation bus 12 is electrically coupled to the allocation signal pins 100A-100C of each one of the power devices 10A-10C to become a first synchronized signal bus. As a result, an AND logic operation performed on the logic level of the allocation signal pins 100A-100C of each of the power devices 10A-10C results in the logic level of the allocation bus 12. In other words, the logic level of the allocation bus 12 becomes high level only when the logic levels of all the allocation signal pins 100A-100C are high level.

The control units 104A-104C of the power devices 10A-10C respectively adjust the logic levels of the allocation signal pins 100A-100C and the logic level of the allocation bus 12 according to the operation status of the power output units 102A-102C to dynamically control part of the power devices to enter the standby mode to optimize the power supplying efficiency of the whole power system 1.

Figure 2:
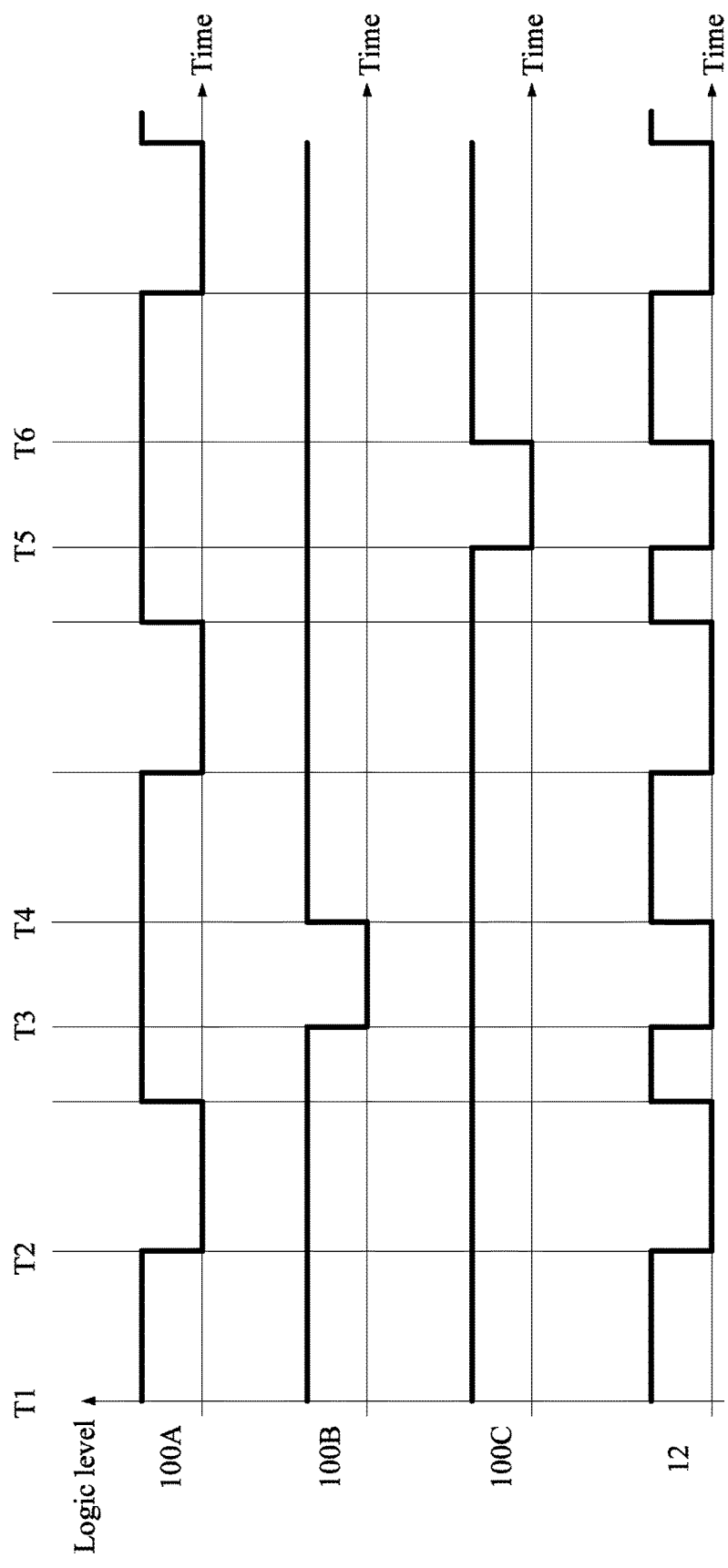
FIG. 2 is a timing diagram of the logic levels of the allocation signal pins and the allocation bus in an embodiment of the present invention.

FIG. 2 is a timing diagram of the logic levels of the allocation signal pins 100A-100C and the allocation bus 12 in an embodiment of the present invention. Detail description of the operation of the power system 1 is made according to the timing diagram.

At first, the control units 104A-104C set the power output units 102A-102C to be under the operation mode at time T1 such that the allocation signal pins 100A-100C become the first logic level to further set the allocation bus 12 to be the first logic level. In an embodiment, the first logic level is high level. Under such a condition, the power output units 102A-102C output the currents 101A-101C to the load 110.

Subsequently, the control units 104A-104C of the power devices 10A-10C set one of the power devices 10A-10C to be under the master mode through a first arbitration at time T2.

The procedure of the first arbitration includes the following steps: Firstly, the control units 104A-104C detect the first logic level of the allocation bus 12 when the time section between time T1 and time T2 finishes. Further, the control unit of one of the power devices 10A-10C sets the corresponding allocation signal pin to be the second logic level, such as the control unit 104A of the power device 10A sets the allocation signal pin 100A to be the second logic level, to further set the allocation bus 12 to be the second logic level through the logic operation. In an embodiment, the second logic level is a low level. Under such a condition, the control unit 104A of the power device 10A sets the power output unit 102A to be the master mode. The power device 10A becomes the master mode.

It is appreciated that when at least two of the power devices 10A-10C are set to be the master mode, which means that two allocation signal pins are set to be the second logic level, the first arbitration needs to be performed between the control units 104A-104C of these power devices 10A-10C such that part of these power devices leave the master mode until only one of the power devices 10A-10C is set to be the master mode. Moreover, the power output unit of the power device under the master mode still provides current to the load 110.

When the control units 10B-10C of the other power devices 104B-104C detect the second logic level of the allocation bus 12, the other power devices 104B-104C keep staying in the operation mode.

When the first arbitration at time T2 is finished, the allocation signal pin 100A of the power device 10A under the master mode to output the first logic level and the second logic level in an interlacing manner with a first period, i.e. output the high level and the low level in the interlacing manner. In an embodiment, the first period is 0.5 Hz. However, the present invention is not limited thereto. Under such a condition, the control units 104B-104C of the other power devices 10B-10C under the operation mode still keep monitoring the operation status of the corresponding power output units 102B-102C and the status of the allocation bus 12.

When at least one of the power devices 10B-10C under the operation mode, such as the power device 10B, is under a first operation status, the power device 10B under the first operation status is set to be the ready-to-standby mode through a second arbitration at time T3. In an embodiment, the first operation status is that a load amount of the power output unit 100B of the power device 10B is lower than a predetermined lower limit value and the power output unit 100B does not operate under a predetermined optimum efficiency status. In an embodiment, the power output unit 100B is determined to operate under the predetermined optimum efficiency status when the current value of the current 101B of the power device 10B is within the range of 30%-60% of the rated current. When the current value of the current 101B of the power device 10B is below the 30% of the rated current, the load amount of the power output unit 100B of the power device 10B is determined to be lower than a predetermined lower limit value and the power device 10B is determined to be at the first operation status. However, it is appreciated that the numerical values mentioned above is merely an example, the determination of the load status in the present invention is not limited thereto.

The second arbitration only occurs during the time period that the allocation signal pin of the power device under the master mode is at the first logic level. As illustrated in FIG. 2, in an embodiment, the second arbitration occurs at time T3, but is not limited thereto. The procedure of the second arbitration includes: within the power devices 10B-10C under the operation mode, the control unit 104B of the power devices 10B that satisfies the first operation status sets the corresponding allocation signal pin 100B to be the second logic level such that the allocation bus 12 is set to be the second logic level. The power output unit 102B of the power device 10B enters the ready-to-standby mode. In other words, the power device 10B enters the ready-to-standby mode.

When the control unit 104C of the other power device 10C detects the second logic level of the allocation bus 12, the power device 10C keeps the corresponding power output unit 102C staying in the operation mode.

It is appreciated that when at least two of the power devices are under the first operation status, e.g. when the power devices 10B and 10C are both under the first operation status, one of the power devices, such as the power device 10B, is set to be under the ready-to-standby mode through the second arbitration, and the other power device 10C is still in the operation status.

In practical applications, similar to the first arbitration, a multiple of power devices 10B-10C may be simultaneously set to the ready-to-standby mode, which means that a multiple allocation signal pins are set to be the second logic level. Under such a condition, the control units of the power devices under the operation mode in the power system detect the load condition of the corresponding power output units again. When the load amount of at least one of the power output unit is larger than the predetermined upper limit value, the control units of all the power devices in the power system respectively set the corresponding power output units to be under the operation mode. The power system 1 further repeats the procedure of times T1-T4.

In an embodiment, taking the power device 10B as an example, the predetermined upper limit value is 60% of the rated current. In other words, when the current 101B from the power device 10B is determined to be larger than 60% of the rated current, the control units 104A-104C of the power devices 10A-10C respectively set the corresponding power output units 102A-102C to be under the operation mode. It is appreciated that the numerical values mentioned above is merely an example. The determination of the load status in the present invention is not limited thereto.

At time T4, the power output unit 102B of the power device 10B switches from the ready-to-standby mode to the standby mode. The control unit 104B controls the corresponding allocation signal pin 100B to output the first logic level. Under such a condition, the power output unit 102B of the power device 10B stops outputting the current 101B to the load 110.

In an embodiment, after time T4, when the power output unit 102C of the power device 10C under the operation mode is under the second operation status, the power system 1 is balanced. When no other event or condition occurs, each of the power devices keeps operating according to the respective mode.

In an embodiment, the second operation status is that the power output unit 102C of the power device 10C is under a predetermined optimum efficiency status.

In an embodiment, the second operation status is that the number of the power device under the operation mode is zero. In other words, the second operation status is the condition that only the power device 10A under the master mode is in operation in the whole power system 1. Under such a condition, even the total load amount is too low such that the load amount of the power output unit 102C of the power device 10A is not under the predetermined optimum efficiency status, the number of the power devices in operation within the power system 1 can not be lower. As a result, the stable second operation status is accomplished.

After time T4, when the power system 1 does not reach the balance status, the control unit 104C of the power device 10C that is not under the second operation status keeps monitoring the operation status of the power device 10C itself and the status of the allocation bus 12. In an embodiment, taking FIG. 2 as an example, after the power device 10B enters the standby mode, the control unit 104C of the power device 10C detects the power output unit 102C is under the first operation status. The second arbitration is performed in the time period between times T5-T6, as in the time period between times T3-T4. The power output unit 102C enters the ready-to-standby mode and enters the standby mode subsequently. In another embodiment, still taking FIG. 2 as an example, after the power device 10B enters the standby mode, the control unit 104C of the power device 10C detects that the load amount of the corresponding power output unit 102C exceeds the predetermined upper limit value. The control units 104A-104C of the power devices 10A-10C in the power system 1 respectively sets the corresponding power output units 102A-102C to be under the operation mode. The power system 1 further repeats the procedure of times T1-T4.

In other embodiments, when the number of the power devices is more than the number illustrated in FIG. 1, the power device 10C and the other power devices in the power system 1 simultaneously keep monitoring operation status of each other and the logic level of the allocation bus 12 such that at least one of the power devices enters the standby mode through one or more second arbitrations until all the power output units in the power devices under the operation mode are under the second operation status.

Figure 3:
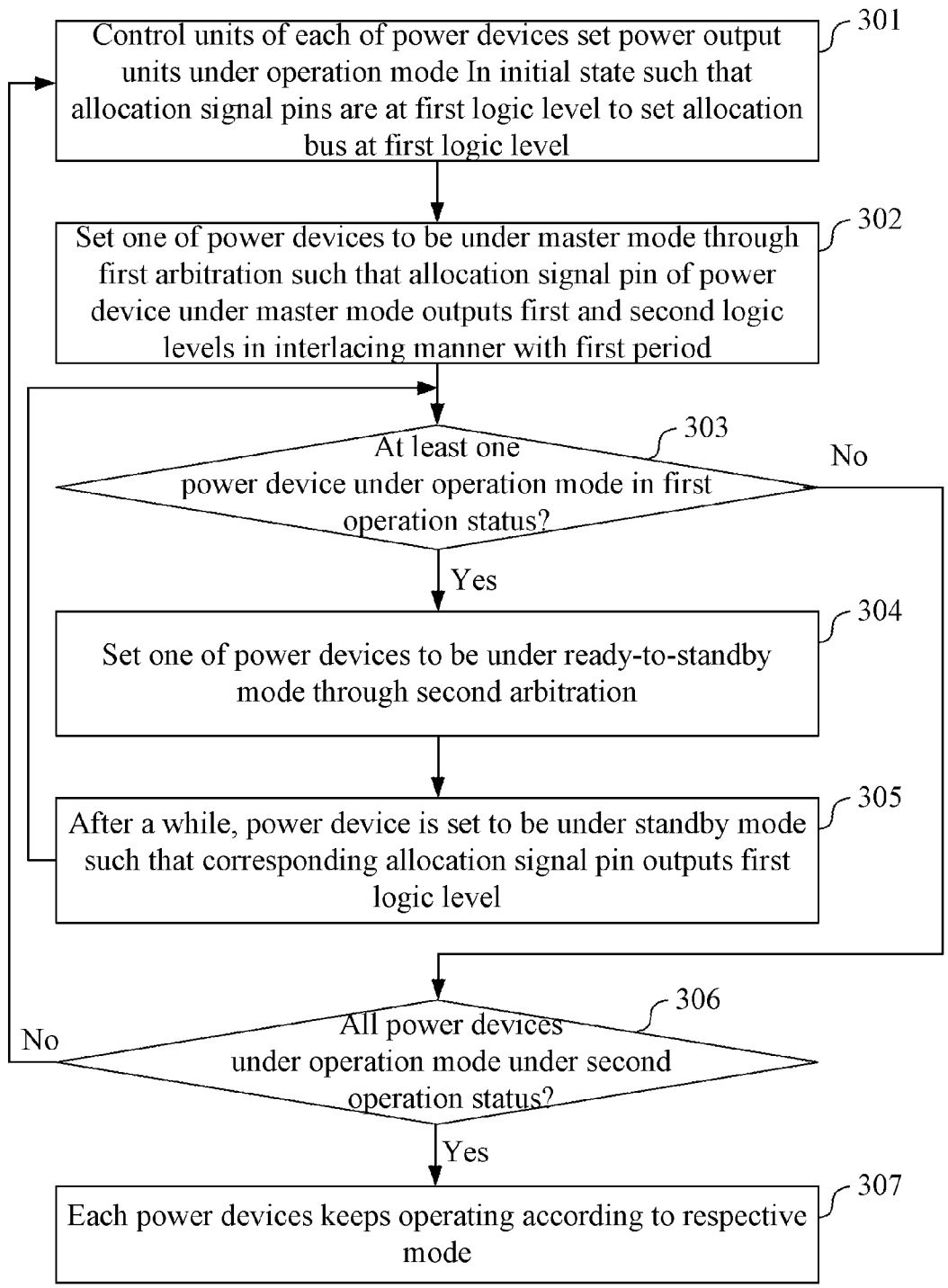
FIG. 3 is a flow chart of a power allocation method in an embodiment of the present invention.

Reference is now made to FIG. 3. FIG. 3 is a flow chart of a power allocation method 300 in an embodiment of the present invention. The power allocation method 300 is used in the power system 1 illustrated in FIG. 1 and the timing diagram in FIG. 2. The power allocation method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the control units 104A-104C of each of the power devices 10A-10C set the power output units 102A-102C under the operation mode at time T1 such that the allocation signal pins 100A-100C are at the first logic level to set the allocation bus 12 at the first logic level. In an embodiment, the first logic level is the high level. Under such a condition, the power output units 102A-102C output the currents 101A-101C to the load 110.

In step 302, the control units 104A-104C of the power devices 10A-10C set one of the power devices 10A-10C (e.g. the power device 10A) to be under the master mode at time T2 through the first arbitration such that the allocation signal pin 100A of the power device 10A under the master mode outputs the first logic level and the second logic level in the interlacing manner with the first period at time T2 after the first arbitration is finished.

In step 303, the other power devices 10B-10C under the operation mode simultaneously monitor the operation status of each other and the status of the allocation bus 12 to determine whether at least one of the power devices 10B-10C under the operation mode is under the first operation status.

When at least one of the power devices 10B-10C is under the first operation status, the flow goes to step 304 such that one of the power devices (e.g. the power device 10B) is set to be under the ready-to-standby mode through the second arbitration.

In an embodiment, the first operation status is that the load amount of the power output unit 100B of the power device 10B is lower than a predetermined lower limit value and the power output unit 100B does not operate under a predetermined optimum efficiency status. The procedure of the second arbitration includes: within the power devices 10B-10C under the operation mode, the control unit 104B of the power devices 10B that satisfies the first operation status sets the corresponding allocation signal pin 100B to be the second logic level such that the allocation bus 12 is set to be the second logic level. The power output unit 102B of the power device 10B enters the ready-to-standby mode.

Subsequently, in step 305, after a while, the power device 10B is set to be under the standby mode such that the corresponding allocation signal pin 100B outputs the first logic level.

After step 305, the flow goes back to step 303 to keep performing determination. When there is no power device under the operation mode is under the first operation status, the flow goes to step 306 to determine whether all the power devices under the operation mode are under the second operation status. When not all the power devices under the operation mode are under the second operation status, the flow goes back to step 301 to keep performing determination.

When all the power devices under the operation mode are under the second operation status, the flow goes to step 307 such that each of the power devices keeps operating according to the respective mode to end the flow.

Figure 4:
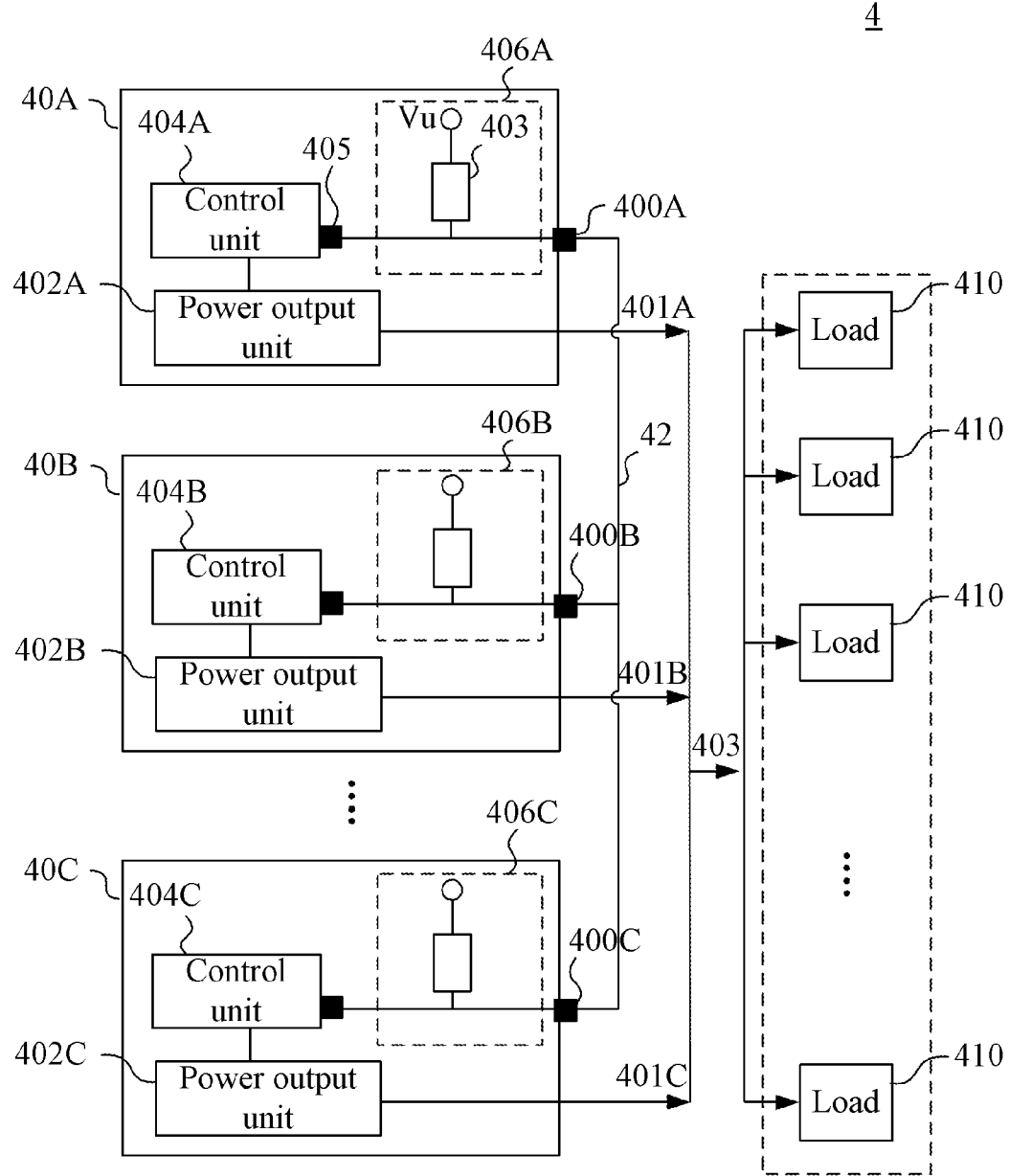
FIG. 4 is a block diagram of the power system in an embodiment of the present invention.

Reference is now made to FIG. 4. FIG. 4 is a block diagram of the power system 4 in an embodiment of the present invention. The power system 4 includes a plurality of power devices 40A-40C connected in parallel and a wake-up bus 42. In an embodiment, the power devices 40A-40C of the power system 4 form a redundant power system.

Each of the power devices 40A-40C includes a wake-up signal pin 400A-4000, a power output unit 402A-402C and a control unit 404A-4040. Taking the power device 40A as an example, the control unit 404A thereof is electrically coupled to the power output unit 402A and the wake-up signal pin 400A.

The power devices 40A-40C outputs currents 401A-401C by using the power output units 402A-402C under the operation mode that superimpose together to form the current 403 to supply power to a load 410. In different embodiments, the number of the power devices 40A-40C and the load 410 can be adjusted according to practical needs and is not limited by the number illustrated in FIG. 4.

The control units 404A-404C control a logic level of the corresponding wake-up signal pins 400A-400C based on an operation status of the power output units 402A-402C. In an embodiment, the control units 404A-404C control the logic level of the corresponding wake-up signal pins 400A-400C through pull-up circuits 406A-406C in the power devices 40A-40C respectively.

In an embodiment, taking the pull-up circuit 406A as an example, the pull-up circuit 406A includes a pull-up resistor 403 and a pull-up voltage Vu. The first end of the pull-up circuit 406A is electrically coupled to the control unit 404A and the second end of the pull-up circuit 406A is electrically coupled to the wake-up signal pin 400A. The first end of the pull-up resistor 403 is electrically coupled to the pull-up voltage Vu and the second end of the pull-up resistor 403 is electrically coupled to the first end and the second end of the pull-up circuit 406A. When the control unit 404A sets a pin 405 thereof to be the low level, the first end of the pull-up circuit 406A and the second end of the pull-up resistor 403 are at the low level such that the second end of the pull-up circuit 406A becomes low level to set the wake-up signal pin 400A to be the low level. On the contrary, when the control unit 404A sets the pin 405 to be the high impedance state, since the second end of the pull-up resistor 403 is electrically coupled to the second end of the pull-up circuit 406A, the pull-up voltage Vu forces the second end of the pull-up circuit 406A to output the high level through the pull-up resistor 403 to further set the wake-up signal pin 400A to be the high level.

In an embodiment, in the redundant power system 4, the power devices 40A-40C have a current averaging characteristic. In other words, the current values of the currents 401A-401C generated by the power devices 40A-40C are identical to share the loading.

As a result, for a single power device, such as the power device 40A, the load condition of the whole power system 4 can be determined according to the load condition of the power output unit 402A thereof. In an embodiment, the control unit 404A obtains the load condition of the power system 4 and the operation status of the corresponding power output unit 402A based on the sampled current value of the currents 401A-401C to control the logic level of the wake-up signal pin 400A.

The wake-up bus 42 is electrically coupled to the wake-up signal pins 400A-400C of each one of the power devices 40A-40C to become a second synchronized signal bus. As a result, an AND logic operation performed on the logic level of the wake-up signal pins 400A-400C of each of the power devices 40A-40C results in the logic level of the wake-up bus 42. In other words, the logic level of the wake-up bus 42 becomes high level only when the logic levels of all the wake-up signal pins 400A-400C are high level.

In an embodiment, at least one of the power devices 40A-40C is under the operation mode and at least one of the power devices 40A-40C is under the standby mode. The control units 404A-404C of the power devices 40A-40C monitor the status of the wake-up bus 42 to set all the power devices under the standby mode to the operation mode when the logic level of the wake-up bus 42 is the second logic level. In an embodiment, the second logic level is the low level.

Figure 5:
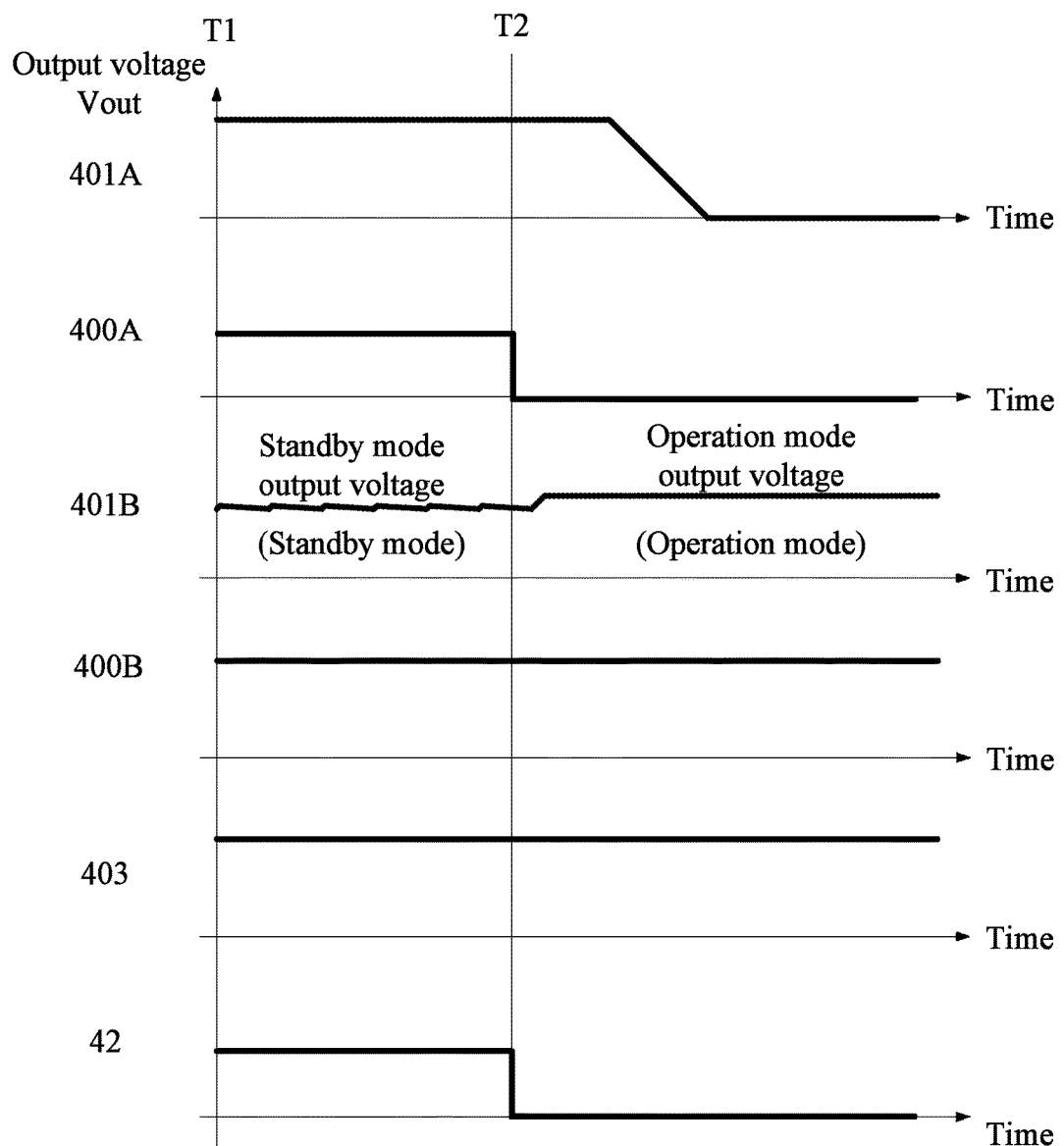
FIG. 5 is a timing diagram of the logic levels of the wake-up signal pins and the wake-up bus in an embodiment of the present invention.

Reference is now made to FIG. 5. FIG. 5 is a timing diagram of the logic levels of the wake-up signal pins 400A-400B and the wake-up bus 42 in an embodiment of the present invention. Detail description of the operation of the power system 4 is made according to the timing diagram. In FIG. 5, only the power device 40A switching from the operation mode to the first status and the power device 40B under the standby mode are illustrated as an example.

At first, the power device 40A is under the operation mode to generate an output voltage Vout and the output current 401A at time T1. The power device 40B is under the standby mode. Whether under the operation mode or the standby mode, the control units 404A-404B set the wake-up signal pins 400A-400B at the first logic level such that the wake-up bus 42 is set to be the first logic level. In an embodiment, the first logic level is the high level.

When the power device 40A enters the first status at time T2, the corresponding control unit 404A sets the corresponding wake-up signal pin 400A to be the second logic level such that the logic level of the wake-up bus 42 is set to be the second logic level. In an embodiment, the second logic level is the low level.

In an embodiment, the control unit 404A determines that the power output unit 402A enters the first status when the power output unit 402A is shut down due to an input voltage drop condition, an over-temperature protection condition, an over-voltage protection condition, an over-current protection condition, a low voltage protection condition, a condition that a shut down command is received or a combination of the above. In other words, the power device 40A enters the first status. Under such a condition, the power device 40A is not able to provide sufficient current 401A or even malfunctions. Other power device 40B under the standby mode needs to be waked up to relocate the power system 4.

Taking the over-temperature protection for an example, when the control unit 404A detects that the temperature of a heat-dissipating plate corresponding to the power output unit 402A exceeds 120 degrees, the power devices under the standby mode are waked up to enter the operation mode and the power device 40A is shut down. The input voltage drop condition, the over-voltage protection condition, the over-current protection condition and the low voltage protection condition can also be detected by the control unit 404A such that the occurrence of an abnormal condition is determined when the voltage, the power or the current is larger or smaller than a predetermined range to wake up the power devices under the standby mode to enter the operation mode and shut down the abnormal power device.

In an embodiment, the control unit 404A determines that the power output unit 402A enters the first status when a load amount of the power output unit 402A is larger than a predetermined load upper limit value, which means that the power device 40 enters the first status.

In an embodiment, when the current 401A is larger than 60% of the rated current, the power device 40A determines that the load of the power system 4 is larger than the predetermined load upper limit value. However, it is appreciated that the numerical values mentioned above is merely an example. The determination of the load status in the present invention is not limited thereto. Under such a condition, the power device 40A is not able to support the current load amount. Though the power device 40A keeps supplying the power, the other power device 40B under the standby mode needs to be waked up to relocate the whole power system 4.

In an embodiment, the whole power system 4 is relocated such that each of the power devices 40A-40C are switched to the operation mode except those that malfunction or fail to be turned on. The control units 404A-404C of the power devices 40A-40C set the wake-up signal pins 400A-400C to be the first logic level such that the logic level of the wake-up bus 42 is set to be the first logic level. Subsequently, the power system 4 uses such as, but not limited to the method illustrated in FIG. 1 to FIG. 3 to perform allocation.

Figure 6:
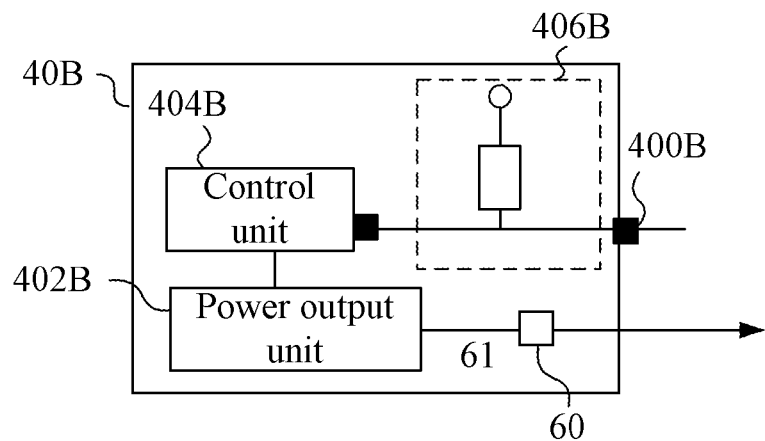
FIG. 6 is a diagram of the power device under the standby mode in an embodiment of the present invention.

Reference is now made to FIG. 4 to FIG. 6. FIG. 6 is a diagram of the power device 40B under the standby mode in an embodiment of the present invention.

In the present embodiment, each of the power devices 40A-40C further includes an blocking circuit, such as the blocking circuit 60 corresponding to the power device 40B exemplarily illustrated in FIG. 6. The blocking circuit 60 is electrically connected between an output end of the power output unit 402B and a load 410.

Since the time that the power devices 40A-40C switches from the standby mode to the operation mode takes such as, but not limited to 1 second to 3 seconds, in an embodiment, the inner power output unit 402B in the power device 40B under the standby mode is not fully turned off in order to save time. The power output unit 402B generates the output voltage 61 lower than that under the operation mode. The output voltage 61 corresponds to the current 401B in FIG. 5. In an embodiment, the output voltage generated by the power device 40B under the standby mode is 90% to 95% of the output voltage generated under the operation mode. The lower output voltage is blocked by the blocking circuit 60 and the power output unit no longer provides power to the load 410. When the power device 40B switches to the operation mode, the blocking circuit 60 switches to the ON-state and the power output unit with normal voltage value resume to provide power to the load 410.

In an embodiment, the blocking circuit 60 is an ORing circuit including switches, diodes or a combination of the above. When the power device 40B is under the standby mode, the control unit 404B controls the switches or the diodes in the ORing circuit to be turned off to disconnect the ORing circuit. When the power device 40B is under the operation mode, the control unit 404B controls the switches or the diodes in the ORing circuit to be conducted such that the ORing circuit is conducted. The substantial control mechanism is not described herein. Those skilled in the art can select the appropriate control mechanism according to the practical condition.

Figure 7:
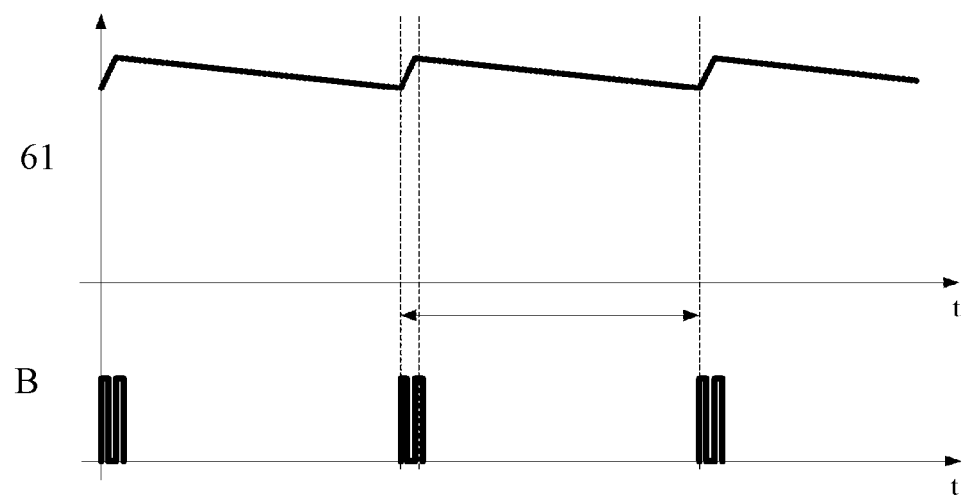
FIG. 7 is a waveform diagram of the output voltage generated by the power device under the standby mode in an embodiment of the present invention.

Reference is now made to FIG. 7. FIG. 7 is a waveform diagram of the output voltage 61 generated by the power device 40B under the standby mode in an embodiment of the present invention.

In an embodiment, the power device 40B uses the burst mode to generate the output voltage 61 under the standby mode. In other words, the driving mechanism is not continuous and the output voltage is kept stable by turning on and off the power output unit 402B. The control unit 404B of the power device 40B realizes the burst mode of the power output unit 402B by setting a first predetermined voltage value and a second predetermined voltage value. When the output voltage of the power output unit 402B is larger than a second predetermined voltage value, the power output unit 402B is turned off such that the output voltage 61 decreases, and when an output voltage of the power output unit 402B is lower than the first predetermined voltage value, the power output unit 402B is conducted such that the output voltage 61 increases. The periodic behavior forms the waveform in FIG. 7.

For the power device 40B under the burst mode, the power output unit 402B thereof stays in the turn-off status for a large part of time. The time of the power consumption is thus short, and the efficiency of the power system is high. Further, due to the existence of the blocking circuit 60, the voltage ripples generated due to the burst mode cannot be output to the load 410 due to the isolation performed by the blocking circuit 60.

Accordingly, in one embodiment, the power system 4 may wake up the power devices 40A-40C under the standby mode efficiently when the power supplying ability is not enough. In other embodiment, the power system 4 may rapidly restore the power supply voltage level of the power devices 40A-40C under the standby mode by using the design of the power output unit and the blocking circuit. The efficiency of the power system is optimized.

Figure 8:
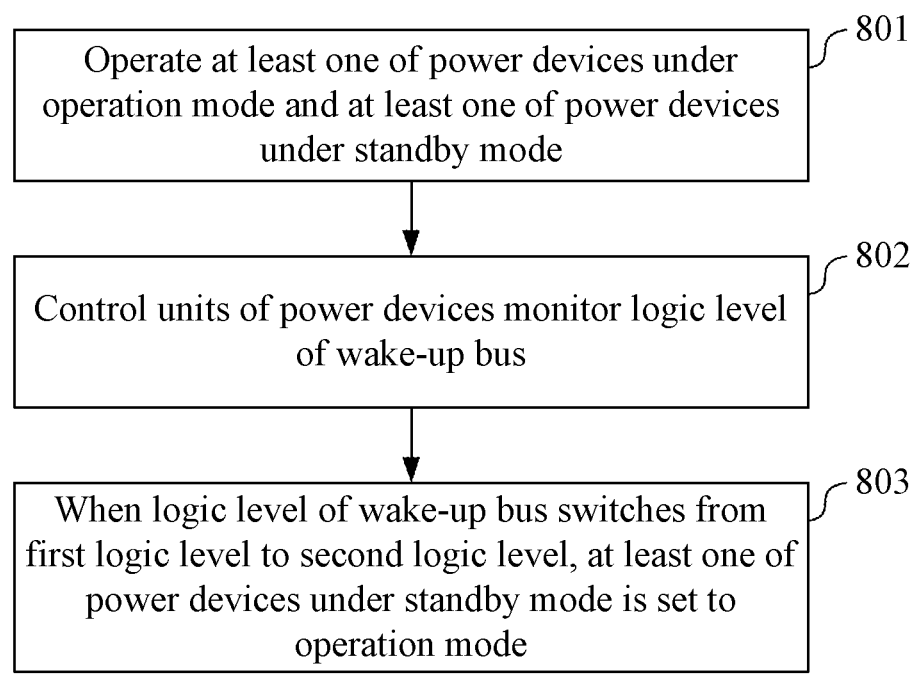
FIG. 8 is a flow chart of a power wake-up method in an embodiment of the present invention.

FIG. 8 is a flow chart of a power wake-up method 800 in an embodiment of the present invention. The power wake-up method 800 is used in the power system 4 illustrated in FIG. 4. The power wake-up method 800 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 801, at least one of the power devices 40A-400 is operated under the operation mode and at least one of the power devices 40A-40C is operated under the standby mode.

In step 802, the control units 404A-404C of the power devices 40A-40C monitor the logic level of the wake-up bus.

In step 803, when the logic level of the wake-up bus 42 switches from the first logic level to the second logic level, the at least one of the power devices 40A-40C under the standby mode is set to the operation mode.

Step 803 further includes: when the control unit detects that the corresponding power device under the operation status enters a first status, the control unit sets the logic level of the corresponding wake-up signal pin to be the second logic level. In an embodiment, the control unit determines that the power output unit enters the first status when the power output unit is shut down due to an input voltage drop condition, an over-temperature protection condition, an over-voltage protection condition, an over-current protection condition, a low voltage protection condition, a condition that a shut down command is received or a combination of the above. In other words, the power device 40A enters the first status. In another embodiment, the control unit determines that the power output unit enters the first status when a load amount of the power output unit is larger than a predetermined load upper limit value, which means that the power device enters the first status.

It is appreciated that in the power system 1 or the power system 4, when a new power device is added, the new power device and the original power devices are all set to be under the operation mode to perform allocation.

The advantage of the present invention is that through the design of the power system, the allocation bus and the operation status of the power devices are used to determine the load amount such that part of the power devices are set to be under the standby mode when the load amount is low to dynamically adjust the power supplying efficiency of the power system.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power system comprising:
   a plurality of power devices connected in parallel each comprising:
      an allocation signal pin;
      a power output unit; and
      a control unit electrically coupled to the power output unit and the allocation signal pin, wherein the control unit controls a logic level of the allocation signal pin based on an operation status of the power output unit; and
   an allocation bus electrically coupled to the allocation signal pin of each one of the power devices to become a synchronized signal bus, wherein an AND logic operation performed on the logic level of the allocation signal pin of each of the power devices results in the logic level of the allocation bus;
   wherein one of the power devices is under a master mode and the other power devices under an operation mode simultaneously monitor the operation status of each other and the logic level of the allocation bus such that when at least one of the power devices under the operation mode is under a first operation status and the allocation bus is at a first logic level, the power system sets one of the power devices under the first operation status to a standby mode through a second arbitration and controls the allocation signal pin to output the first logic level.

2. The power system of claim 1, wherein when the power system is in an initial status, the power devices are all under the operation mode and the allocation bus is set to be the first logic level; after the initial status, the power system sets one of the power devices to the master mode through a first arbitration and controls the allocation signal pin of the power device under the master mode to output the first logic level and a second logic level in an interlacing manner with a first period such that the allocation bus outputs the first logic level and the second logic level in the interlacing manner with the first period, wherein the first arbitration comprises:
   the control unit of one of the power devices sets the corresponding allocation signal pin to be the second logic level when the logic level of the allocation bus is at the first logic level such that the allocation bus is set to be the second logic level; and
   when the control unit of the other power devices detects the second logic level of the allocation bus, the other power devices keep staying in the operation mode.

3. The power system of claim 1, wherein the first operation status is that a load amount of the power output unit of the power device is lower than a predetermined lower limit value.

4. The power system of claim 1, wherein the second arbitration comprises:
the control unit of at least one of the power devices under the first operation status sets the corresponding allocation signal pin to be the second logic level such that the allocation bus is set to be the second logic level; and
when the control unit of the other power devices detects the second logic level of the allocation bus, the other power devices keep staying in their original modes.

5. The power system of claim 1, when the power devices under the operation mode are all under a second operation status, the power system is determined to be balanced, wherein the second operation status is that the power output unit of the power devices is under a predetermined optimum efficiency status, or the second operation status is that the number of the power devices under the operation mode is zero and the number of the power device under the master mode is one.

6. The power system of claim 2, wherein when at least two of the power devices are set to be the master mode, the power system sets at least one of the at least two power devices to be the master mode through the first arbitration.

7. The power system of claim 2, wherein when at least two of the power devices under the first operation status are set to be the standby mode and when a load amount of the power output unit of at least one of the power devices under the operation mode is larger than a predetermined upper limit value, the power system is set to be the initial status such that the power devices are all set to be under the operation mode.

8. The power system of claim 2, wherein when at least one of the power devices malfunctions, the power system is set to be the initial status such that the power devices that do not malfunction are all set to be under the operation mode.

9. The power system of claim 2, wherein when a new power device is added in the power system, the power system is set to be the initial status such that the new power device and the power devices are all set to be under the operation mode.

10. The power system of claim 2, wherein when a load amount of the power output unit of one of the power devices is larger than a predetermined upper limit value, the power system is set to be the initial status such that the power devices are all set to be under the operation mode.

11. A power allocation method used in a power system comprising a plurality power devices connected in parallel and an allocation bus, wherein each of the power devices comprises an allocation signal pin, a power output unit and a control unit electrically coupled to the power output unit and the allocation signal pin, wherein the control unit controls a logic level of the allocation signal pin based on an operation status of the power output unit and the allocation bus is electrically coupled to the allocation signal pin of each one of the power devices to become a synchronized signal bus, wherein an AND logic operation performed on the logic level of the allocation signal pin of each of the power devices results in the logic level of the allocation bus, the power allocation method comprises:
setting one of the power devices under a master mode; and
when at least one of the power devices under an operation mode is under a first operation status and the allocation bus is at a first logic level, setting one of the power devices under the first operation status to a standby mode through a second arbitration and controlling the allocation signal pin to output the first logic level.

12. The power allocation method in claim 11, wherein in an initial status, the power devices are all under the operation mode and the allocation signal pin thereof is set to be the first logic level such that the allocation bus is set to be the first logic level; after the initial status, one of the power devices is set to the master mode through a first arbitration and the allocation signal pin of the power device under the master mode is controlled to output the first logic level and a second logic level in an interlacing manner with a first period such that the allocation bus outputs the first logic level and the second logic level in the interlacing manner with the first period, wherein the first arbitration comprises:
setting the allocation signal pin to be the second logic level by the corresponding control unit of one of the power devices when the logic level of the allocation bus is at the first logic level such that the allocation bus is set to be the second logic level; and
keeping the other power devices staying in the operation mode when the control unit of the other power devices detects the second logic level of the allocation bus.

13. The power allocation method in claim 11, wherein the first operation status is that a load amount of the power output unit of the power device is lower than a predetermined lower limit value.

14. The power allocation method in claim 11, wherein the second arbitration comprises:
setting the allocation signal pin to be the second logic level by the corresponding control unit of at least one of the power devices under the first operation status such that the allocation bus is set to be the second logic level; and
keeping the other power devices keep staying in their original modes when the control unit of the other power devices detects the second logic level of the allocation bus.

15. The power allocation method in claim 11, when the power devices under the operation mode are all under a second operation status, the power system is determined to be balanced, wherein the second operation status is that the power output unit of the power devices is under a predetermined optimum efficiency status, or the second operation status is that the number of the power devices under the operation mode is zero and the number of the power device under the master mode is one.

16. The power allocation method in claim 12, further comprising:
when at least two of the power devices are set to be the master mode, setting at least one of the at least two power devices to be the master mode by the control unit thereof through the first arbitration.

17. The power allocation method in claim 12, further comprising:
when at least two of the power devices under the first operation status are set to be the standby mode and when a load amount of the power output unit of at least one of the power devices under the operation mode is larger than a predetermined upper limit value, setting all the power devices to be under the operation mode.

18. The power allocation method in claim 12, further comprising:
when at least one of the power devices malfunctions, setting the power system to be the initial status such that the power devices that do not malfunction are all set to be under the operation mode.

19. The power allocation method in claim 12, further comprising:

when a new power device is added in the power system, setting the power system to be the initial status such that the new power device and the power devices are all set to be under the operation mode.

20. The power allocation method in claim 12, further comprising:

when a load amount of the power output unit of one of the power devices is larger than a predetermined upper limit value, setting the power system to be the initial status such that the power devices are all set to be under the operation mode.

* * * * *